THOMAS L. REED.

Improvement in the Manufacture of Water Proof Hose.

No. 125,331.                               Patented April 2, 1872.

Witnesses
Isaac A. Brunell
David Heaton

Inventor
Thomas L. Reed 125,331

UNITED STATES PATENT OFFICE.

THOMAS L. REED, OF PROVIDENCE, RHODE ISLAND.

IMPROVEMENT IN THE MANUFACTURE OF WATER-PROOF HOSE.

Specification forming part of Letters Patent No. 125,331, dated April 2, 1872.

SPECIFICATION.

I, THOMAS L. REED, of the city and county of Providence and State of Rhode Island, have invented a new and useful Improvement in the Manufacture of Water-Proof Hose, of which the following is a specification, referring by letters to the accompanying drawing making part of the same, in which—

Figure 1:
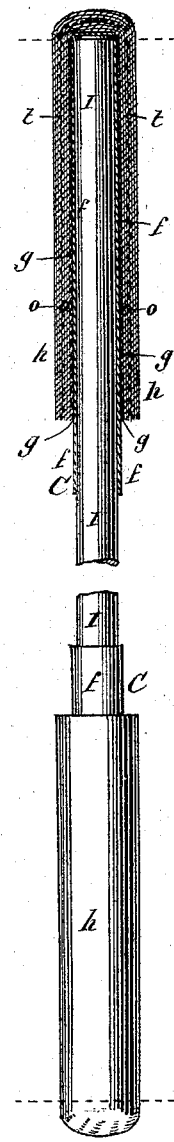
Figure 2:
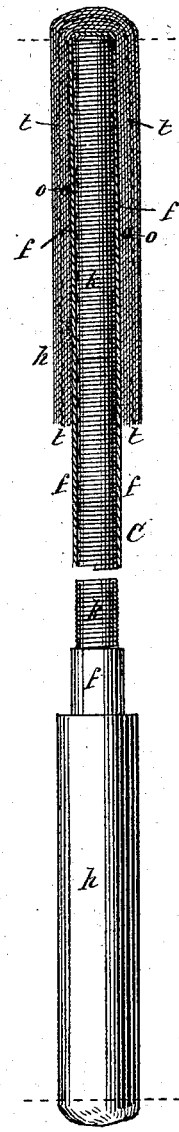
Figure 3:
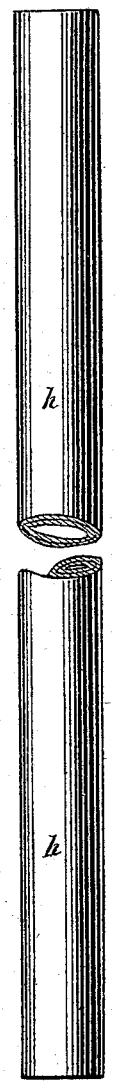

Figure 1 is a sectional view of the said hose and a stiff arbor or core on which it is made. Fig. 2 is a like view of the said hose and a flexible arbor or core. Fig. 3 is a view of a broken length of the hose complete as it comes from the said cores.

Similar letters indicate like parts in all the figures.

My invention relates to making hose, for hydrants and other purposes, of alternate sheaths or layers of India rubber or other vulcanizable gum or compound and braided or plaited threads or yarns of fibrous material; and consists in the mode of combining the same to form a tube or hose, as hereinafter described, the object being to make vulcanized-rubber or other like gum hose of considerable continuous length, and capable of withstanding extreme pressure, more expeditiously and at a cheaper cost than heretofore.

To make tubes or hose by my improved mode, I have a smooth metal rod, I, somewhat longer than the intended tube, and slightly less in diameter than the intended bore of the tube, and coat the rod with some material or compound that will adhere to the rod and be smooth and flexible under ordinary temperatures, but that will become fusible by heating. This coating forms a separator, $f$, and, with the rod, forms the core C of the proposed tube, said separator being, properly, about one thirty-second ($\frac{1}{32}$) of an inch in thickness, evenly distributed over the surface of the rod. If the lining of the tube is to be of India rubber, I cover the said prepared core with a thickness of vulcanizable India rubber, O, in the usual way, as shown in Fig. 2, leaving it projecting at the ends sufficiently to be brought together, and inclose and hermetically seal the tube at the ends to prevent the escape of any portion of the separating compound when in fusion from the heat of vulcanization. I then pass the India-rubber-covered core through a braiding-machine and plait or braid a fibrous sheath or covering, $t$, thereon over all from end to end, after which I apply a second sheath or covering of India-rubber compound, $h$, closing the same completely at the ends, as before; and, if desired, this may be followed with one or more additional sheaths of braid-work and India rubber until the required thickness or strength is obtained; or the first sheath may be of braid-work $g$ on the core, followed by a sheath of India rubber or other gum, O, then by a sheath of braid-work, $t$, and, finally, by a sheath of India rubber, $h$, as shown in Fig. 1, the ends of the mass on the core being hermetically sealed, as before described, after which the whole is rolled to unite the sheaths, and then vulcanized in the usual way; and immediately afterward, while yet in the heated condition, cut off the sealed ends of the tube and withdraw the core therefrom while the separator is in a fusible condition, when the tube or hose is completed.

In making tubes of considerable length, wherein a stiff rod would be objectionable and inconvenient, a flexible core may be employed, the same consisting of a spirally-wound cylinder of wire or tube, $k$, Fig. 2, of the requisite length, and wound closely, and which may itself be coated with the separator $f$ to form the core, or the wire cylinder may be first covered with braid-work and this coated with the separator $f$, as shown in Fig. 2, and thus form a flexible core, which may be treated in all respects like the inflexible core I, with the advantage of its being capable of coiling, and thereby requiring less space to perform the several operations, and being perfectly adapted to pass through the braiding-machine by which the braided sheath is applied, and whereby such tubes can be conveniently and expeditiously manufactured without any prescribed limit as to length. In the use of this flexible core the braided covering to which the separator is applied has the effect to confine and prevent the convolutions of wire from separating when the core is being removed, and this form of the flexible core is preferred for this reason to the other, whereon no braid is used to receive the separator; but in some cases it will be found most convenient, and in some perhaps absolutely necessary, to remove the core by unwinding the spiral cylinder, in which event it would be, in general, preferable without the covering of braid, which would be worthless after the wire core had been withdrawn from it.

A fusible separator for the core may be made as follows, viz.: Take two (2) pounds of rosin or gum copal or other like gum, (as a stiffener;) one pound of Spanish brown or like pigment, (as a drier;) and one-half ($\frac{1}{2}$) pound of bees-wax, paraffine, or Barbary tallow, (as a solvent.) Melt the rosin and bees-wax together and stir in the Spanish brown while in a heated state, say at 200°, so it mingles, and apply to the core, while warm, with a suitable brush. This separator is applicable to other branches of India-rubber manufacture, as well as to tubes or hose.

Having described my invention, I claim—

1. The method, substantially as herein described, of making tubes or hose of vulcanizble India rubber and other like gum and plaited or braided sheaths of fibrous material by means of a core covered with a hard fusible separator, and, by sealing the ends, to prevent the escape of the separating compound when heated, substantially such as specified.

2. I also claim, in the manufacture of water-proof hose, the use of the removable spiral wire core, substantially as and for the purpose set forth.

3. I also claim, in the manufacture of water-proof hose, the use of the hard fusible separator, substantially as described, as a covering for the removable core, for the purposes set forth.

THOMAS L. REED.

Witnesses:
ISAAC A. BROWNELL,
DAVID HEATON.